(Model.)

W. W. WYTHE.
CASH INDICATOR AND REGISTER.

No. 401,725. Patented Apr. 16, 1889.

WITNESSES.
Geo. W. Evans
Chas. A. Smith

INVENTOR.
W. W. Wythe
by W. H. Wythe
Attorney.

(Model.)

W. W. WYTHE.
CASH INDICATOR AND REGISTER.

No. 401,725. Patented Apr. 16, 1889.

(Model.) 7 Sheets—Sheet 3.

W. W. WYTHE.
CASH INDICATOR AND REGISTER.

No. 401,725. Patented Apr. 16, 1889.

Witnesses
Geo. W. Evans
Chas. A. Smith

Inventor
William W. Wythe
William H. Wythe, Attorney

(Model.)

W. W. WYTHE.
CASH INDICATOR AND REGISTER.

No. 401,725. Patented Apr. 16, 1889.

WITNESSES.

INVENTOR.

(Model.) 7 Sheets—Sheet 6.

W. W. WYTHE.
CASH INDICATOR AND REGISTER.

No. 401,725. Patented Apr. 16, 1889.

Witnesses
Gw. W. Evans
Chas. A. Smith

Inventor,
William W. Wythe
William H. Wythe, Attorney.

(Model.)

W. W. WYTHE.
CASH INDICATOR AND REGISTER.

No. 401,725. Patented Apr. 16, 1889.

Witnesses
Geo. W. Breck
Edward Thorpe

William W. Wythe, Inventor
By his Attorney Wm. H. Wythe

UNITED STATES PATENT OFFICE.

WILLIAM W. WYTHE, OF CHAUTAUQUA, NEW YORK.

CASH INDICATOR AND REGISTER.

SPECIFICATION forming part of Letters Patent No. 401,725, dated April 16, 1889.

Application filed July 3, 1888. Serial No. 278,912. (Model.)

*To all whom it may concern:*

Be it known that I, WILLIAM W. WYTHE, of Chautauqua, in the county of Chautauqua and State of New York, have invented a new and useful Improvement in Cash Registers and Indicators; and I do hereby declare the following to be a full, clear, and exact description thereof, reference being had to the accompanying drawings, forming a part of this specification, in which—

Like symbols of reference indicate like parts in each.

My invention consists, first, in an improved device for indicating numerals by the movement into view of slides upon which are the figures, and, second, in devices for registering the figures or amounts so exhibited. It is especially designed for indicating and registering the sales in shops and stores.

Figure 7:
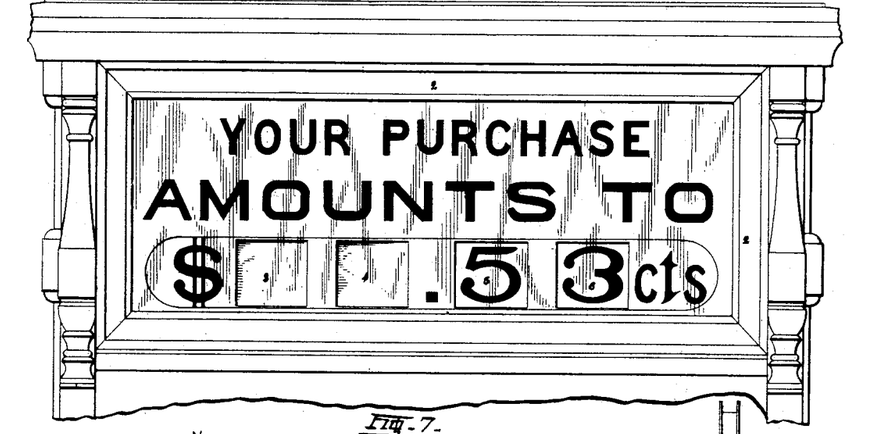
Fig. 7 is a partial front view, showing the face of the machine displaying the amount of purchase.

In the drawings, 1 indicates the frame within which the different parts are mounted and arranged. The front portion of this case is shown in Fig. 7 of the drawings. Near the top of this frame is a panel, 2, upon which may be printed or otherwise formed the device "The amount of your purchase is," below which device are four or more openings, 3, 4, 5, and 6, through which the figures on the slides appear when these slides are brought to view, and a period is printed between the openings to represent a decimal point. At the rear face of the case are arranged banks of keys 8, 9, 10, and 11, Fig. 1, each bank having nine keys, commencing on the left of the lower bank, 8, with the figure 1 and ending with the figure 9; on the second bank, 9, commencing with the figure 10, the next key of the bank being 20, and so on by tens to the last, which is numbered 90. The third bank, 10, is numbered like the first and the fourth bank, 11, like the second.

The two lower banks are used to indicate cents in the spaces 5 and 6, (shown in Fig. 7,) and the two upper banks dollars in the spaces 3 and 4. These keys are secured to the free ends of levers which are journaled on shafts 12 13 14 15, Fig. 4, extending transversely across the frame and secured thereto, each bank of keys having its own shaft. The other end of each key-lever is attached by a connecting-rod, A, to a vertical sliding rod, 16, Fig. 4, working in slots in the frame 1, carrying the indicating-slides.

Figure 9:
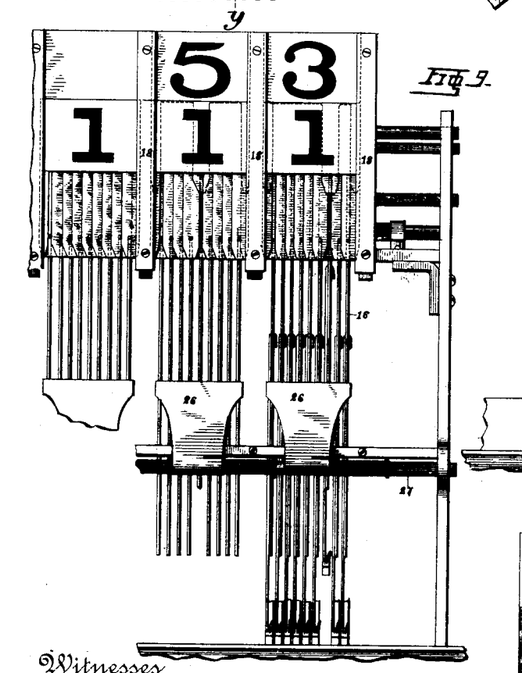
Fig. 9 is a partial front view, the case being omitted, showing the slides raised.
Figure 11:
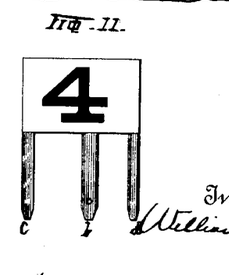
Fig. 11 is a detail view of one of the indicating-slides.
Figure 12:
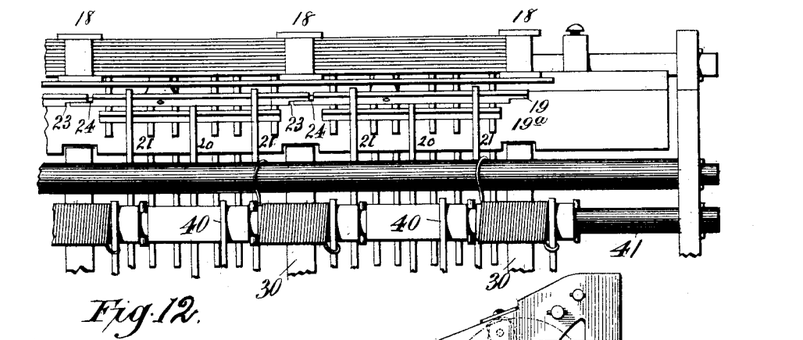
Fig. 12 is a partial plan view, showing the method of operating the zero-slides.
Figure 14:
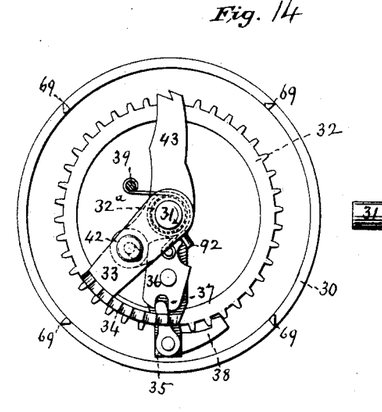
Figs. 14, 15, and 16 are detailed views showing the quadrant and its connections.
Figure 15:
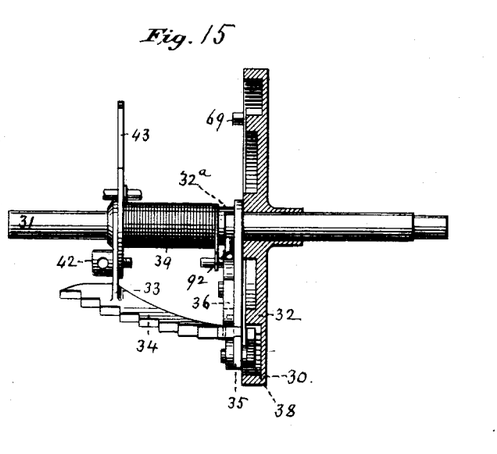
Figure 16:
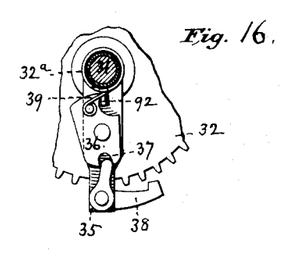

Inside of the case, back of the openings 3, 4, 5, and 6, is a slide-case, 18, Fig. 9, for holding the indicating sliding plates, upon which sliding plates the dollar and cent numerals are formed or printed. These cases each contain ten slides, numbered on their faces from zero to 9, the zero-slides being at the rear and the unit-slides being next to the openings in the case. As shown in Fig. 11, each of these slides is cut away, so as to leave an extending arm, $b$, which is attached to a horizontal projection on the top of the vertical sliding rod 16, which passes through a hole in said arm, the slide-arms $c\ d$ being only to guide the slides in the case 18. Each slide of each series has its extending arm situated in a different position, so as to allow a free movement of the sliding rod 16 and a free movement of the slides in the case 18, these arms overlapping, so as to give mutual support, the rods 16 being arranged parallel with each other in the same vertical plane. The zero-slides, which are rearmost in the slide-cases, are not cut away, and are not attached to the rods 16, nor are they attached to any of the key-levers, although they are arranged to be actuated thereby. This is accomplished by means of the bar 19, Fig. 1, extending transversely across and resting loosely upon the top of each series of the vertical rods 16. To this bar the zero-slide is firmly attached, so that when any key of the series is depressed the zero-slide is carried up as well as the slide corresponding to the key; but the zero-slide is not exhibited, being in the rear of the other slide. The bar 19 is attached to the arms 20 21, extending at right angles from it to a sleeve on the shaft 22, to which they are secured, serving to operate the mechanism for unlocking the cash-drawer, as hereinafter described.

Upon one end of the bar 19 is a lug, 23, which engages with the lug 24 of the bar 19 of the next series, so that when any one of the indicating-slides is raised before the openings 5, 4, or 3 the zero-slide in all of the series to the right of these openings (looking to the front) is also raised at the same time and exhibited, unless another slide in that series is raised, in which case the zero-slide is hid from view, being in the rear of the other slides.

On each of the sliding rods 16 is a tooth, 25, which, when the rod is raised sufficiently to exhibit the figured slide, engages with the spring-pawls 26, which are journaled on the shaft 27 in front of each series, and thereby the slides are held in their elevated position. In the rear of the frame 1 is a plate, 28, extending transversely across the machine, provided with five or more openings, 29, behind each of which is a wheel, 30, the circumference of which is divided into four equal parts, each of which parts is provided with figures equally spaced from 0 to 9. These wheels are loosely mounted on the shaft 31, and on one side of each wheel is secured a toothed wheel, 32.

Figure 8:
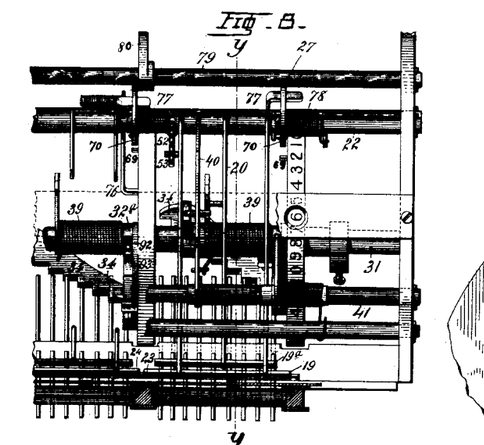
Fig. 8 is a partial plan view, shown partly in section 1.
Figure 10:
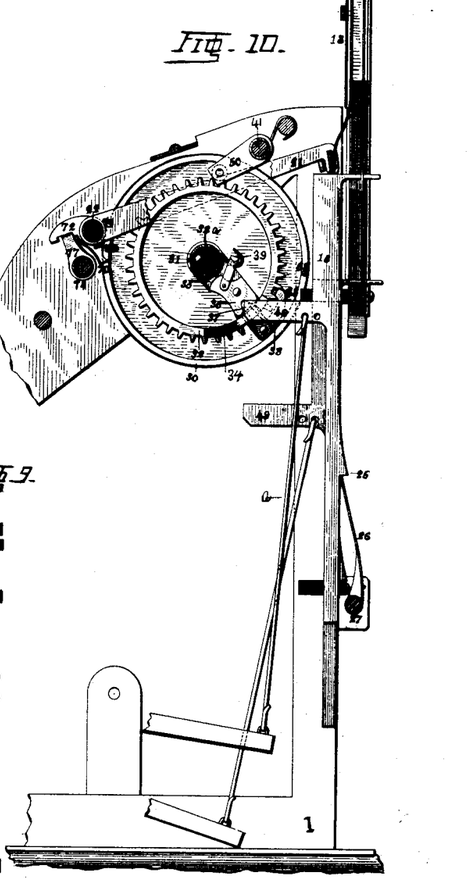
Fig. 10 is a sectional view on the line $y\ y$ of Fig. 8, showing the slide-operating mechanism.

On the shaft 31 are sleeves $32^a$ at the right of each wheel, from each of which, at right angles to the shaft, extends an arm, 33, to which is secured a curved arm, 34, Fig. 8, which, for convenience, I will designate a "quadrant," and which is the segment of a hollow cylinder or tube cut obliquely to its axis, and on the edge of which is a series of nine notches or steps corresponding with and facing the nine vertical sliding rods 16. This arm 34 extends so that each notch, beginning from the end nearest the wheel, is at a greater distance from the rods 16 than the notch preceding it. The end of the quadrant toward the wheel is secured to the arm 35, Fig. 10, which is firmly secured to the sleeve $32^a$, this arrangement allowing a free movement of the quadrant around the shaft 31. On the arm 35 is pivoted a plate, 36, having a notch, 37, at one end, which engages with one end of the shank of the pawl 38, which is pivoted on the arm 35 and engages with the teeth of the wheel 32. On the sleeve $32^a$ is a coiled spring, 39, one end of which bears on the plate 36, so as to bring the pawl 38 into engagement with the teeth of the wheel 32, while the other end is attached to the arm 40, which is journaled on a sleeve loosely mounted on the shaft 41.

Extending from the sleeve $32^a$, and secured to the arm 35 by means of the adjustment-screw 42, is an arm, 43, provided at the extremity with a notch which normally engages with the pin 44 on the arm 40, thus locking the quadrant in position. Journaled on the shaft 31 is an arm, 46, Fig. 4, so arranged that when the shaft is rotated backward it will engage with the pin 44, Fig. 5, raising the arm 40, thus releasing the arm 43 and allowing the quadrant to be carried forward by the action of the coiled spring 39. At the same instant the pawl 38 is brought into engagement with the toothed wheel 32, carrying the wheel 30 forward.

Figures 4, 13:
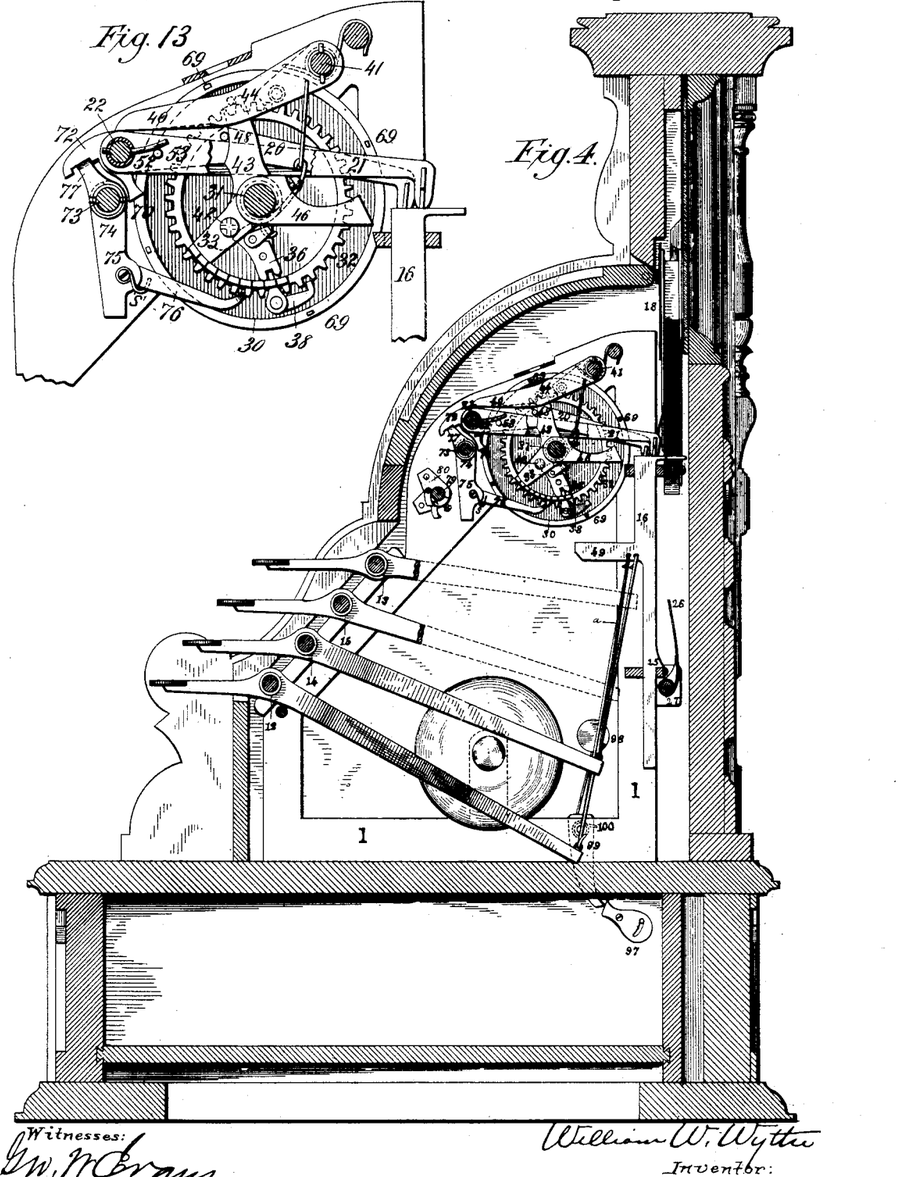
Fig. 4 is a vertical longitudinal section on the line $x\ x$ of Fig. 2.
Fig. 13 is a vertical longitudinal section on the line X X of Fig. 2, showing the carrying mechanism and locking arms.
Figures 5, 6:
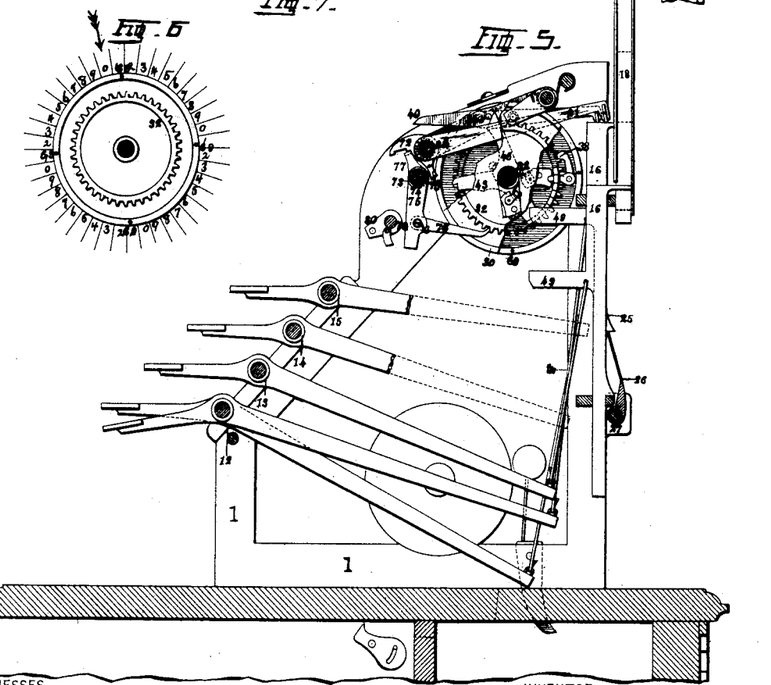
Fig. 5 is a similar view showing the parts in the position when a key is struck and the carrying mechanism caused to operate.
Fig. 6 is a side view of one of the counting-wheels, showing how it is numbered.

On the arm 20, loosely journaled on the shaft 22, and extending from the bar $19^a$, (which rests loosely upon the sliding rods 16, so as to be raised when any key of the corresponding series is struck,) is a pin, 48, Fig. 4, against which the arm 43 bears. When the arm 40 is raised by the arm 46, the quadrant is still locked in position by the pin 48 until a key is depressed, when the arm 20 is carried upward by the sliding rod 16, thus freeing the arm 43. It will be readily seen that this arrangement acts as a double lock on the quadrant, so that one or more sets of slides and one or more wheels may be operated without interfering with the other wheels.

On the sliding vertical rods 16 are projections 49, extending backward, which, when the quadrant is unlocked, engage with the notches on the front face of the quadrant. Thus, if the first key of a series is depressed, the shaft 31 is rotated by mechanism hereinafter described and the quadrant is unlocked, as described above. The quadrant is carried upward by this action of the spring 39, but engages with the stop 49 of the first rod 16 of the series, allowing the wheel to be carried forward only one step or one-fortieth of a revolution. If the ninth key of a series is depressed, the ninth vertical rod 16 is raised, and its stop 49 engages with the ninth notch on the quadrant, allowing the wheel to be carried forward nine steps or nine-fortieths of a revolution. Journaled on the shaft 41 are arms 50, provided at their extremity with a roller-detent engaging with the toothed wheels 32, acting as a brake on the wheels, so as to prevent their being carried too far forward by their momentum.

Figure 1:
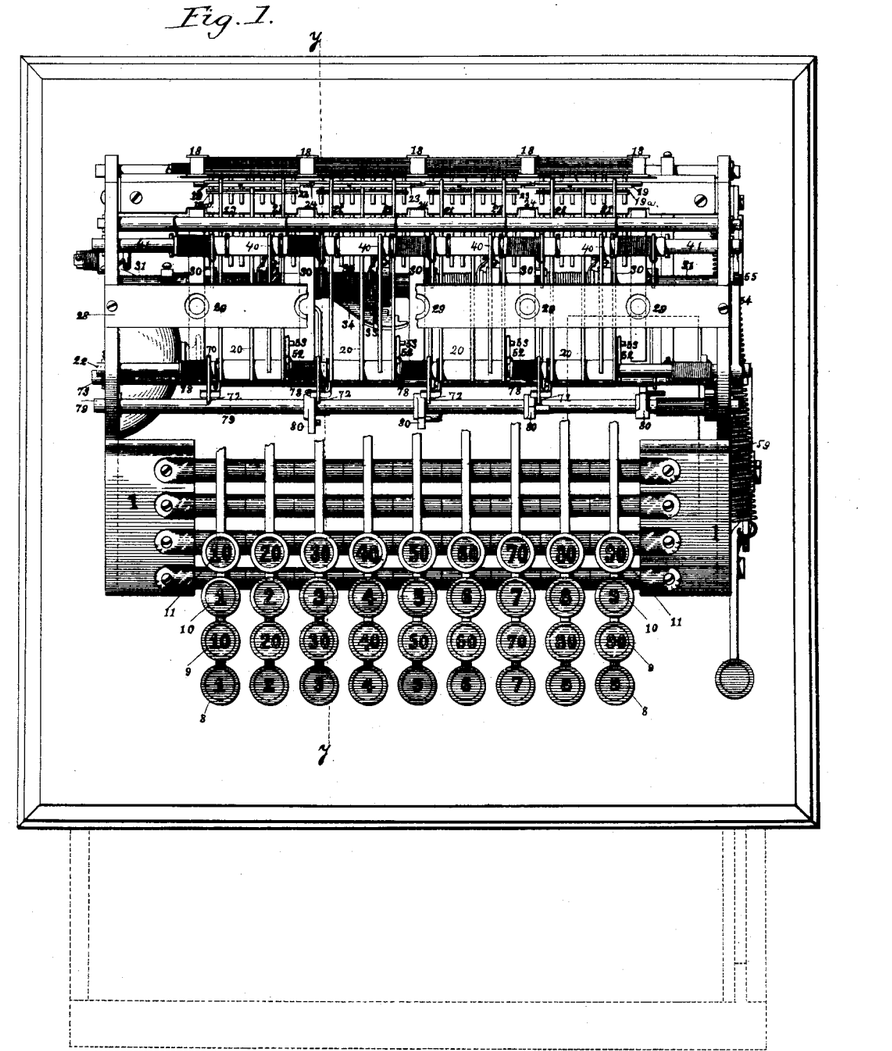
Figure 1 is a plan of my improved cash-register, the case being omitted.
Figure 2:
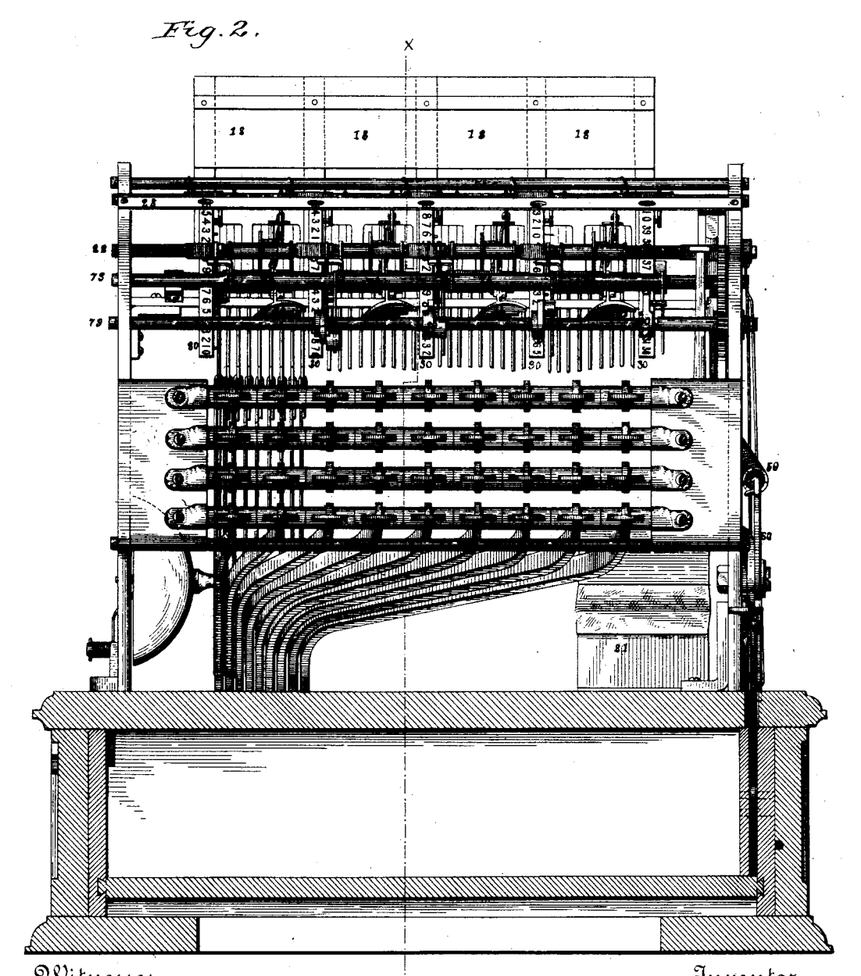
Fig. 2 is a rear elevation, the lower portion containing the drawer being shown in section.

On the shaft 22, Figs. 1 and 4, are inserted pins 52, so arranged that when a key is depressed and the arms 21 raised by the action of the vertical rods 16 the pins 53 on the arms 21 engage with the pin 52 and cause the shaft 22 to rotate.

Figure 3:
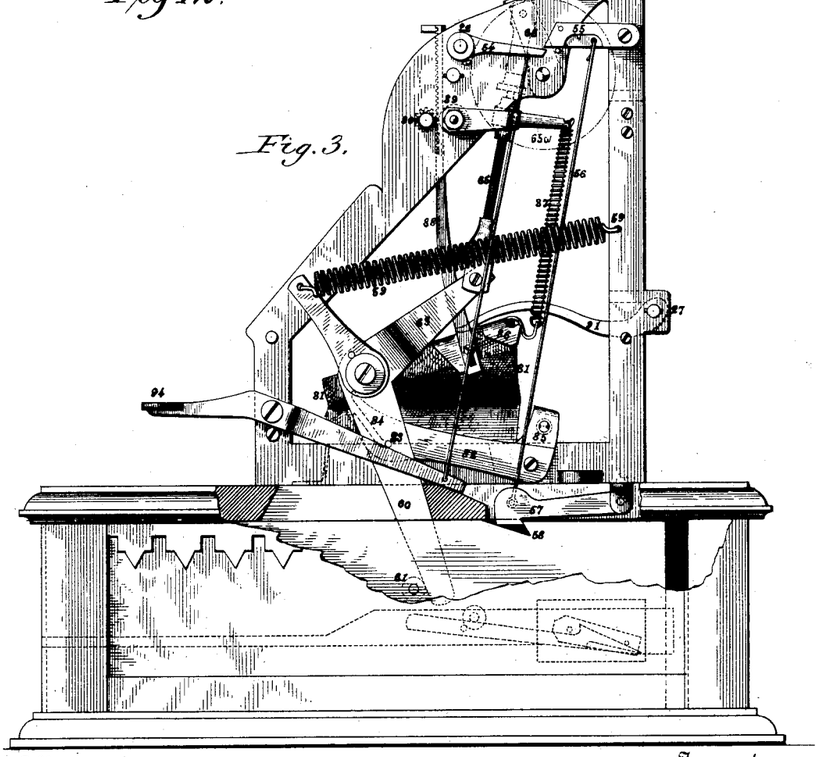
Fig. 3 is a side elevation illustrating the drawer-operating mechanism, the case being omitted.

On the outside of the frame 1, Fig. 3, and secured to the shaft 22, is an arm, 54, which, when the shaft is rotated by the raising of the arms 21, engages with and lifts the arm 55, pivoted on the frame 1. The arm 55 is connected by a rod, 56, with the hook 57, which engages with the notch 58 on the edge of the money-drawer. When the shaft 22 is rotated, as above described, the hook 57 is raised sufficiently to release the drawer, which is then thrown open by the action of the spring 59 and the arm 60, which is pivoted on the frame 1 and presses upon the roller 61. When a key is depressed and the drawer thrown open, the arm 63, which is attached to the arm 60, is depressed. This arm is pivoted to the connecting-rod 65, which is pivoted at its upper extremity to an arm, 66, which is journaled on the shaft 31, so that when the arm 63 is depressed the shaft 31 is rotated sufficiently to engage the arm 46 with the pin 44 and release the quadrant 34, as above described.

On the circumference of each of the wheels 30 are four pins, 69, at equal distances apart, so arranged that when the wheels make a quarter of a revolution and the figure 0 appears at the openings 29 on the plate 28 these pins engage with the lugs 70, Fig. 4, extending from the arms 72, which are mounted on the sleeves 71 on the shaft 22. On the shaft 73 are sleeves 74, extending from each of which, except the first, is an arm, 75, to the lower end of which is pivoted a pawl, 76, engaging with the wheel 32, while on the other end of the sleeve is a lug, 77, which engages with a notch on the arm 72 behind the preceding wheel. Attached to the arm 75 is a coiled spring, s, (shown in Figs. 1 and 4,) one end of which bears upon the pawl 76, so that when the pins 69 engage with the lug 70 and the lug 77 is released the pawl is retracted one tooth on the wheel 32, preparatory to its action on that wheel.

Around the shaft 79, at convenient distances apart, are inserted lugs 80, so arranged that they bear successively against the arms 75 when the shaft is rotated and push the pawls 76, which have been retracted, as above described, back to their normal position, carrying the wheel 32 of the next higher series one step forward.

When the pawls 76 and the arm 75 are in their normal position, they are out of the path of the lugs 80. By these devices, whenever any of the wheels 30 passes the nine-space, the pawl 76 on the next wheel is retracted, thus being prepared to move the wheel one step forward, when the shaft 79 is revolved, which is accomplished by the closing of the drawer by a method hereinafter described.

Referring to Fig. 3, 81 is a bellows normally open, as shown in the drawings. Extending from the connecting-rod 65 is an arm, 65ª, connected to one end of a spiral spring, 87. This spiral spring is wound about a rod, one end of which rests upon the bellows, and upon the upper end of which the arm 65ª rests loosely when a portion of the hook of the bellows is open. When the drawer is opened, the arm 65ª is depressed and the bellows closed by the pressure on this rod. Pivoted to the frame 1 is an arm, 82, bearing a lug, 85, and supported by a pin, 83, on the arm 60, working in a slot, 84, so that when the drawer is opened the arm 82 is depressed sufficiently to engage with the hook 86 on the bellows. When the drawer is closed, the bellows is held closed by the hook 86, and the spiral spring 87 is extended until the drawer is fully closed, when the lug 85 is raised by the pin 83 sufficiently to release the hook 86, allowing the spring to retract and the bellows to slowly open.

Extending upward from the bellows is an arm, 88, the upper end of which carries a rack, 89, which engages with the pinion 90 on the shaft 79, so that when the bellows is released by the closing of the drawer and opened by the action of the spring 87 the shaft 79 is rotated so as to operate the carrying mechanism, as above described.

Extending from the shaft 27 is a curved arm, 91, one end of which rests upon the bellows, so that when the bellows is released the arm is raised and causes the shaft 27 to revolve sufficiently to disengage the pawls 26 from the teeth 25 and allow the indicating-slides to drop from view.

Inserted on the shaft 31, and working in a slot on the sleeves 32ª, are pins 92, Fig. 8, so arranged that when the drawer is closed and the shaft 31 revolved backward they engage with the sleeve 32, so as to carry the quadrant back to its normal position, winding up the spring 39, at the same time engaging with the lug 93, so as to release the pawl 38.

In Fig. 3 is shown a blank key, 94, on a lever pivoted to the case 1, and operating by means of a connecting-rod the arm 54, so as to release the money-drawer without raising any of the indicating-slides or registering any sales.

Pivoted on the inside of the cash-drawer is an arm, 97, which, when the drawer is opened, engages with and throws back the arm 99, to which the bell-hammer 98, controlled by the spring 100, is attached, so that when a key is depressed and the drawer released the bell is sounded, calling the attention of the proprietor and the purchaser to the fact that a sale has been registered.

By the foregoing description it will be seen that the registering mechanism is operated entirely by the opening and closing of the money-drawer, the action of the key-levers being only to raise the indicating-slides and to unlock the different parts.

At the close of each day's business the amount of the sales is read from the opening in the plate 28, when each wheel should be set forward until the figure 0 appears at the openings, and the machine is ready for another day's work.

I claim—

1. In a cash register and indicator, the combination of the coiled springs 39 with the money-drawer D by means of the bent lever 60 63, connecting-rod 65, arm 66, sleeves 32ª, and pins 92, by means of which the closing of the drawer winds up the springs, substantially as described.

2. In a cash register and indicator, the combination of the coiled springs 39 with the registering-wheels 32 by means of the notched plates 36 and locking-pawls 38, whereby the wheels 32 are carried forward when the springs are released, substantially as described.

3. In a cash register and indicator, a curved arm, 34, constructed as the segment of a hollow cylinder or tube cut obliquely to its axis and bearing upon one edge nine notches or steps supported by radial arms 33 35, proceeding from a sleeve, 32ª, which turns loosely upon the shaft 31, in combination with a registering-wheel, 32, and arms 49, by means of which the registering-wheel may be stopped at varying distances.

4. In a cash register and indicator, the combination of the curved arm 34 and spring 39 with an arm, 49, connected with a key-lever, so that when the key is depressed the arm 49 acts as a stop on the curved arm 34, substantially as described.

5. In a cash register and indicator, the combination of the curved arm 34 with the wheels 32 by means of the pawl 38 and plate 36, so that upon the release of the springs the wheel and pawl act as one piece, substantially as described.

6. In a cash register and indicator, the combination of the notched arms 43 with the pins 44 and arms 40, by means of which the curved arms 34 are held in position and the springs retained in tension, substantially as described.

7. In a cash register and indicator, the combination of the arms 46 with the pins 44 and arms 40, by means of which the arms 43 are released by the backward movement of the shaft 31 consequent upon opening the drawer, substantially as described.

8. In a cash register and indicator, the combination of two or more series of keys with the arms 43 and quadrants 34 by means of the rods 16, bars 19ª, arms 20, and pins 48, so that the depression of any key of a series disengages the arm 43 and releases the spring 39 corresponding to that series, substantially as specified.

9. In a cash register and indicator, the combination of the pins 92 and shaft 31 with the locking-pawls 38 by means of the notched plate 36, so that by the rotation of the said shaft backward the pawls are lifted from the teeth of the wheels 32 and move independently of them, substantially as described.

10. In a cash register and indicator, the sleeve 74, with lugs 77 and jointed pawls 75 76, in combination with the notched arms 72, lugs 70, and pins 69, so arranged that when the pins 69 engage with the lugs 70 the arms 72 are raised sufficiently to release the lugs 77 and the pawls 75 76 are retracted one tooth on the wheels 32, preparatory to their action on the wheels, substantially as described.

11. In a cash register and indicator, the shaft 79, with a series of lugs, 80, arranged upon it, so that upon the rotation of the shaft the lugs press against the retracted pawls 75 76 and push them forward in succession the space of one tooth on the wheels 32, moving the wheels that distance, substantially as described.

12. In a cash register and indicator, the combination of the bellows 81, rack 89, pinion 90, shaft 79, pawls 76, and wheels 32, by means of which the speed of the carrying mechanism is controlled, substantially as described.

13. In a cash register and indicator, the combination of the shaft 79, lugs 80, and pawls 75 76 with the bellows 81 in such a way that the motion of the wheels 32 by the jointed pawls 76 can only take place when the other mechanism is at rest, substantially as described.

14. In a cash register and indicator, the combination of the retaining-pawls 26 with the bellows 81 by means of the arm 91, so that the rods 16 are kept up until all other motions of the mechanism have ceased, substantially as described.

15. In a cash register and indicator, the combination of the sleeves 32ª, arms 35 43, pins 44, arm 20, and pin 48, by means of which the mechanism is locked until a key is depressed and the shaft 31 is rotated, substantially as described.

16. In a cash register and indicator, the locking-pawl 38, so arranged, in combination with the plate 36, pin 92, shaft 31, arm 66, connecting-rod 65, bent lever 60 63, and drawer D, that the pawl engages with the registering-wheel at the moment the drawer is opened, and remains engaged until the movement of the wheel is completed and the drawer is closed.

17. In a cash register and indicator, the combination of the curved arm 34, the sleeve 32ª, the arms 33 and 35, the plate 36, the pawl 38, engaging with the toothed wheel 32, and the coiled spring 39, substantially as and for the purpose described.

18. The combination of two or more series of vertical sliding rods, 16, carrying the figured indicating-slides, the stops 49, engaging with the notches on the curved arms 34, connecting-rod a, and the key-levers 8 9 10 11, substantially as and for the purpose described.

19. In a cash register and indicator, the combination of the retaining-pawls 26 on the shaft 27, engaging with the tooth 25 on the sliding rods 16, and the arm 91, substantially as and for the purpose specified.

20. In a cash register and indicator, a series of figured plates provided with the arms b at different positions on the plate, and the guiding-arms c d, substantially as and for the purpose described.

21. In a cash register and indicator, the combination of the bar 19, carrying the zero-plate, the arms 20 21, journaled on the shaft 22, and the lugs 23 and 24, substantially as and for the purpose described.

22. In a cash register and indicator, the combination of the arm 35, the locking-pins 44 on the arm 40, the pins 48 on the arm 20, the bar 19$^a$, and the sliding rods 16, substantially as and for the purpose described.

23. In a cash register and indicator, the combination of the pins 52 on the shaft 22, the pins 53 on the arm 21, the arms 54 and 55, pivoted on the frame, the rod 56, and hook 57, engaging with the notch 58, substantially as and for the purpose described.

24. In a cash register and indicator, the combination of the spring 59, the arm 60, and the roller 61, the connecting-rod 65, the arm 66, the shaft 31, and the arm 41, by means of which the drawer is thrown open and the shaft 31 revolved, substantially as and for the purpose specified.

25. In a cash register and indicator, the combination of the pins 69 on the wheel 30, the lug 70, the notched arm 72, the lug 77, the arm 75, sleeve 74, and pawl 76, substantially as and for the purpose specified.

26. In a cash register and indicator, the combination of the lugs 80 on the shaft 79, the pinion 90, the rack 89, the bellows 81, arm 82, pin 83, slot 84, lug 85, and hook 86, substantially as and for the purpose specified.

27. In a cash register and indicator, the combination of the pin 92, inserted on the shaft 31, the lug 93, pawl 38, sleeve 32$^a$, and spring 39, substantially as and for the purpose specified.

28. In a cash register and indicator, the key-levers 8 9 10 11, in combination with the connecting-rods A and rod 16, with its lug 49, by means of which the indicating-slides are raised, and at the same time the registering-wheels are stopped in the proper position, substantially as described.

In testimony whereof I have hereunto set my hand this 29th day of June, A. D. 1888.

WM. W. WYTHE.

Witnesses:
CHAS. E. SHADE,
W. H. WYTHE.